(12) United States Patent
Bremer et al.

(10) Patent No.: US 7,159,986 B2
(45) Date of Patent: Jan. 9, 2007

(54) WIDE FIELD COLLIMATOR

(75) Inventors: James C. Bremer, Silver Spring, MD (US); Bert A. Pasquale, Laurel, MD (US); Tmitri J. Zukowski, Alexandria, VA (US); Barbara J. Zukowski, Alexandria, VA (US); Shahriar Etemad, Alexandria, VA (US); Robert E. Prince, Catonsville, MD (US)

(73) Assignee: Swales & Associates, Inc., Beltsville, MD (US)

( * ) Notice: Subject to any disclaimer, the term of this patent is extended or adjusted under 35 U.S.C. 154(b) by 4 days.

(21) Appl. No.: 10/441,915

(22) Filed: May 20, 2003

(65) Prior Publication Data

US 2006/0274275 A1 Dec. 7, 2006

Related U.S. Application Data

(60) Provisional application No. 60/381,993, filed on May 20, 2002.

(51) Int. Cl.
G03B 21/26 (2006.01)

(52) U.S. Cl. .......................... 353/28; 353/42; 353/102; 348/801; 362/555

(58) Field of Classification Search .................. 356/51, 356/124–127, 229–232; 353/28, 11, 22–24, 353/40, 122, 62, 104, 114, 115, 68, 120, 35, 353/119, 42, 31, 30, 29, 85–87, 102; 359/198, 359/641; 348/800–803; 362/555, 800, 809; G03B 21/26
See application file for complete search history.

(56) References Cited

U.S. PATENT DOCUMENTS 2,243,084 A * 5/1941 Browne ................. 348/240.99
3,286,584 A * 11/1966 Hermann .................... 356/153
3,320,852 A * 5/1967 Parrent, Jr. et al. ........... 353/80
4,298,869 A * 11/1981 Okuno ......................... 345/82
4,599,645 A * 7/1986 Brown et al. ................ 348/123

(Continued)

FOREIGN PATENT DOCUMENTS

EP 0 499 678 A1 8/1992

(Continued)

OTHER PUBLICATIONS

Mildex Inc., Modular Auto-collimator—"OPTITEST A Complete Range of Optical Test Instruments" 3 pages—http://www.mildex.com/testequip/optitest/optitest.html, Oct. 28, 2002.

(Continued)

Primary Examiner—W. B. Perkey
Assistant Examiner—Andrew Sever
(74) Attorney, Agent, or Firm—Fish & Richardson P.C.

(57) ABSTRACT

A collimator is compact and uses power efficient light emitting diodes as the illumination source to generate a test image in collimated space. The collimator provides a test image across a wide field of view, which is useful for calibration of optical devices that have a wide field of regard. An optical projection system in the collimator utilizes an array of light emitting diodes, whose light is converged by a Fresnel lens, through a holographic diffuser plate, onto a target plate bearing the test pattern to be projected out into collimated space through a converging lens. An alignment structure provides translation of the target plate along the main axis of the collimator and provides rotational freedom about two axes (vertical and horizontal) via a gimbal structure mounted on the translation mechanism.

5 Claims, 6 Drawing Sheets

U.S. PATENT DOCUMENTS

| | | | |
|---|---|---|---|
| 4,626,685 A | 12/1986 | Pitalo et al. | 250/341.6 |
| 4,648,695 A | 3/1987 | Mizutani et al. | 353/28 |
| 5,808,800 A * | 9/1998 | Handschy et al. | 359/630 |
| 5,997,150 A * | 12/1999 | Anderson | 362/227 |
| 6,161,940 A * | 12/2000 | Choate et al. | 362/235 |
| 6,191,872 B1 * | 2/2001 | DeCaro et al. | 358/509 |
| 6,347,163 B1 | 2/2002 | Roustaei | 382/324 |
| 6,359,681 B1 | 3/2002 | Housand et al. | 356/4.01 |
| 6,364,490 B1 * | 4/2002 | Krause | 353/77 |
| 6,547,400 B1 * | 4/2003 | Yokoyama | 353/98 |
| 6,606,173 B1 * | 8/2003 | Kappel et al. | 359/15 |
| 6,623,126 B1 * | 9/2003 | Sekiguchi et al. | 353/62 |
| 6,636,104 B1 * | 10/2003 | Henry | 327/536 |
| 6,764,184 B1 * | 7/2004 | Carkner | 353/119 |
| 2002/0057420 A1 | 5/2002 | Nakayama et al. | 353/53 |
| 2004/0101008 A1 * | 5/2004 | Kurtz et al. | 372/39 |

FOREIGN PATENT DOCUMENTS

| | | |
|---|---|---|
| EP | 0 604 269 A1 | 6/1994 |
| JP | 2001-281098 | 10/2001 |

OTHER PUBLICATIONS

Mildex Inc., Modular Auto-collimator—"OPTITEST Instruments" 5 pages—http://www.mildex.com/testequip/optitest/instruments3.html, Oct. 28, 2002.

Kathleen A. Hursen and Robert W. Ross, "The GOES Imager: overview and evolutionary development", GOES-8 and Beyond, E. Washwell, ed., Proc. SPIE vol. 2812, p. 160-173 (1996).

Jeanine E. Murphy and Sanford W. Hinkal, "GOES Sounder overview," GOES-8 and Beyond, E. Washwell, ed., Proc. SPIE vol. 2812, p. 174-181 (1996).

* cited by examiner

WIDE FIELD COLLIMATOR

CROSS REFERENCE TO RELATED APPLICATION

This application claims benefit under 35 U.S.C. § 119(e) from provisional application No. 60/381,993, filed May 20, 2002. The 60/381,993 application is incorporated by reference herein, in its entirety, for all purposes.

STATEMENT CONCERNING GOVERNMENT INTEREST

The U.S. Government has a paid-up license in this invention and the right in limited circumstances to require the patent owner to license others on reasonable terms as provided for by the terms of the MSES Contract, Tasks 2113–226, 2113-PO1, & 00012.1.0226.00.01, awarded by the National Aeronautics and Space Administration (Goddard Space Flight Center).

FIELD OF THE INVENTION

The present invention is generally directed to the field of calibrating optical devices such telescopes and cameras. More particularly, the present invention is directed to projecting a test pattern into the aperture of a scanning, imaging optical instrument so that its dynamic scanning behavior can be characterized over a wide field of regard (FOR).

BACKGROUND OF THE INVENTION

It has been known to use a collimator to provide a test pattern using collimated light for the purpose of calibrating optical devices. These collimators have a number of disadvantages, including large size, high power consumption, high heat dissipation, and high cost of operation.

It has been proposed to include a ground glass plate to diffuse light in a collimation system. Such a diffusing means has the disadvantage of scattering light at all angles, so it reduces optical efficiency. What is need instead is a diffusing means that scatters light across a narrow range of angles, not at all angles.

Collimators have used extended illumination sources, such as the output of an integrating sphere. This approach is inefficient. The diverging output from the exit aperture of the integrating sphere must be captured and projected into the exit pupil of the projection lens. Light that exits the integrating sphere outside the numerical aperture of the condensing lens does not contribute to the useful signal. Also, more condensing lens elements are required to convert the diverging output from the integrating sphere into a converging beam. The over-all length, mass, and cost of this technique are high. What is needed is a light source that has compact length, is not heavy, and is relatively inexpensive.

It has also been proposed to use in a collimator an illumination source with one or more tungsten-halogen lamps. These lamps require high voltages to operate. Their efficiency, defined as the ratio of optical power within the spectral band divided by wallplug electrical power consumption, is far lower than that of off-the-shelf light emitting diodes. Tungsten-halogen lamps have very hot surfaces and can explode if these surfaces become contaminated. In addition, they may require spectral filters to reject out-of-band radiation, and forced-air cooling to reject excess heat. The forced-air cooling is a problem itself because fans induce vibration into the optical system and may cause mischief with optical measurements. Thus, what is needed is a way to make use of light sources for collimators that are more efficient, not prone to explosion, and do not require complex cooling solutions.

SUMMARY OF ASPECTS OF THE INVENTION

One aspect of the present invention is an optical projection system for projecting a test image that is useful for calibrating optical devices.

It is desirable for the optical projection system (in combination with an appropriately matched condenser lens set) to have the following attributes:
  it consumes a minimum amount of power;
  it dissipates a minimum amount of heat and can be cooled by passive conduction and convection;
  it has no surfaces that are hot enough to create a burn hazard to personnel;
  it comes to thermal equilibrium rapidly after turn-on;
  it does not require high voltage; and
  its size, weight, and power consumption are minimized.

It is also desirable to minimize the number of lens elements in the projection lens set, and to minimize the distance between the exit pupil of the lens (the pupil as seen from collimated space) and the front surface of the first lens element. The lens should, of course, provide a satisfactory Modulation Transfer Function (MTF).

An optical projection system according to the present invention employs an LED array, a condensing Fresnel lens, and a diffuser plate to perform the functions of the illumination source and the condensing lens assembly in an illumination system that has major advantages over other systems with respect to efficiency, size, weight, cost, and power consumption. Although components such as LED's, Fresnel lenses, diffuser plates, target plates, and projection lenses are not themselves new, and may have been used previously in optical systems, this collection of components has not been arranged according to the configuration developed for the present invention.

A very high fraction of the light emitted by the LED's is directed through the target plate in the FOV, through the entrance pupil of the projection lens assembly, uniformly filling the pupil but not greatly over-filling it, and into the IUT within a desired spectral band. This efficiency results from the unique interrelationship among the spacings, focal lengths, angles, and other parameters that are described herein. The narrow spectral range of the LED's not only produces high optical efficiency, but also simplifies the design of the projection lens, and of any optical support equipment used to align and test the collimator. Specifically, the projection lens and the autocollimator that is used to align the target plate both contain lenses and have anti-reflection coatings on their refractive elements. The design and fabrication of lenses and of anti-reflection coatings are greatly simplified if they only need to be effective over a narrow spectral range. Since the LED's emit incoherent radiation, coherent interference (speckle) is not a problem. Furthermore, all points on the target plate are illuminated by several LED's.

Another aspect of the present invention is an alignment mechanism for aligning a target plate that bears the test pattern in a collimator.

Alignment of the target plate in the collimator is handled by providing the target plate with three degrees of freedom of movement. The target is free to translate along the optical axis of the collimator, and is mounted on a gimbal structure so that it may rotate about two axes that are nominally orthogonal to the optical axis of the collimator. This configuration is an advance over the prior art because it enables the use of alignment algorithms that are more time efficient than were possible with a structure that provided axial translation at three points on the target plate.

DETAILED DESCRIPTION OF THE INVENTION

Figure 1:
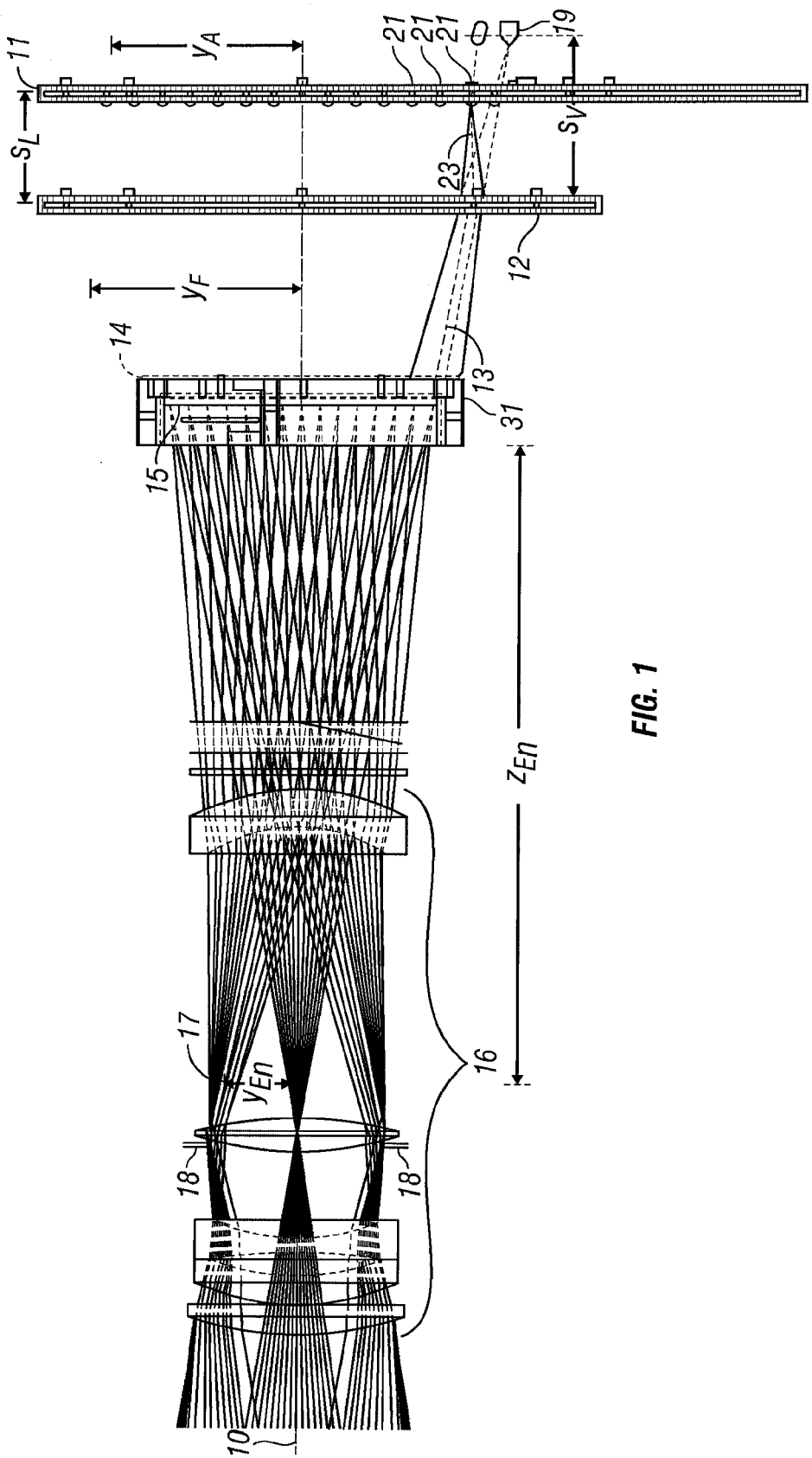
FIG. 1 illustrates the optical design of a wide field collimator according to an embodiment of the present invention.

A collimator embodied according to the present invention projects a test pattern, focused at infinity, over a wide field of view (FOV). This test pattern contains enough optical energy within the bandpass of at least one spectral channel of an instrument under test (IUT) so that a scanning multi-spectral sensor can be tested with an adequate signal to noise ratio (SNR). Since the collimator is not used for spectral characterization of the IUT, it is not important to match the spectrum of the operational targets of the IUT, only to achieve the necessary brightness within the selected spectral band. Also, the collimator has sufficient acuity in the spectral band to project the test pattern. This acuity is usually quantified in terms of the modulation transfer function (MTF) at one or more critical angular frequencies.

Salient optical subsystems of the collimator are an illumination source, a condensing lens assembly, a target plate, a projection lens, and a precision alignment mechanism. The illumination source and the condenser lens assembly are used to illuminate the target plate with radiation that is uniform in intensity and that uniformly fills the entrance pupil of the projection lens. The target plate is a precision optical flat that has a test pattern of opaque and transparent features imprinted on its front surface (the surface that faces the projection lens). When this front surface of the target plate coincides with the focal plane (FP) of the projection lens, the test pattern is projected to infinity by the projection lens. The precision alignment mechanism is useful to adjust the relative orientation of the target plate in at least three precision degrees of freedom with respect to the projection lens. The projected test pattern may be used to characterize the dynamic scanning performance of an IUT (for example, a camera, a telescope, or an orbital imager) that is also focused at infinity. The wide field of view (FOV) of the collimator enables it to characterize the dynamic performance of an IUT that produces images over a wide field of regard (FOR) by means of a scanning mechanism.

In is noted that in cameras, a lens collects light from collimated space, at infinity, and images it at its focal plane. A projection lens is used for the opposite effect, to project an image from its focal plane into collimated space. Therefore, for the projection lens, the entrance pupil is the virtual image of the aperture stop as seen from the focal plane and the exit pupil is the virtual image of the aperture stop as seen from collimated space.

The system projects the test pattern with uniform intensity over its entire FOV. It is very desirable to minimize short-range variations and desirable to minimize long-range variations in the intensity of the illumination projected onto the target plate by the illumination system. For example, if there is a short-range gradient in the intensity of illumination of a transparent feature on the target plate, then the IUT will measure its position inaccurately, with a bias toward the brightly illuminated area of this feature.

The throughput of the projection lens tends to decrease as the field angle increases. This fall-off is due to a combination of factors, including vignetting in the projection lens. It is desirable to minimize the fall-off from the center to the edge of the FOV in the intensity of the test pattern projected by the projection lens. To achieve this goal, the illumination system is biased so that the intensity of the illumination increases slightly from the center to the edges of the FOV on the target plate, to compensate for the decreased transmittance of the projection lens. The intensity should fall to zero rapidly outside the useful FOV. Any light from the illumination system that does not reach the target plane within the FOV is wasted, and may contribute to unwanted background light, rather than to the useful signal.

In order for the lens to achieve the required MTF, the light from the illumination system that reaches the target plate within the FOV fills the exit pupil of the projection lens. It should either illuminate the pupil uniformly or else be slightly apodized, i.e., slightly more intense at the center of the pupil than at its edges. Thus, the theoretically preferred illumination pattern for each point on the target plane is a cone of light with its apex at that point and its axis on a ray passing through that point and the center of the entrance pupil of the projection lens. The cone angle should be matched to or slightly greater than the f/# of the projection lens. Any light transmitted by the target plate outside the entrance pupil of the projection lens is wasted, and may contribute to unwanted background energy.

Finally, the spectrum of the illumination source should be well matched to that of the selected spectral channel in the IUT. The spectral irradiance of the test pattern projected by the collimator should be maximized as well as is practicable within the spectral bandpass of the selected channel and minimized at all other wavelengths.

One embodiment of the present invention is an optical system for projecting 1–11 GH-acuity images over a wide field of view that has an array of LED's with microlenses, a condensing lens, a diffuser plate, a target plate with precision alignment mechanisms, and a projection lens optimized to the spectrum of the LED's. The optical system is useful as a wide field collimator to test optical instruments that have a wide field of regard (FOR).

According to one aspect of the invention, an optical projection system projects an image using an array of light emitting diodes, a Fresnel lens, a holographic diffuser, and a target plate. The array of light emitting diodes projects light of a common color. The Fresnel lens is disposed to converge the light projected by the array of light emitting diodes. The holographic diffuser plate is disposed to diffuse the light condensed by the Fresnel lens. The target plate is disposed to be illuminated by the light diffused by the holographic diffuser plate, so that an image on the target plate is projected.

Referring to FIG. 1, the optical layout of this embodiment is schematically illustrated. The optical axis of the projection lens assembly 16 and that of the Fresnel lens 12 are coincident with the optical axis 10 of the system. The illumination is provided by an array of LED's 11.

Figure 2A:
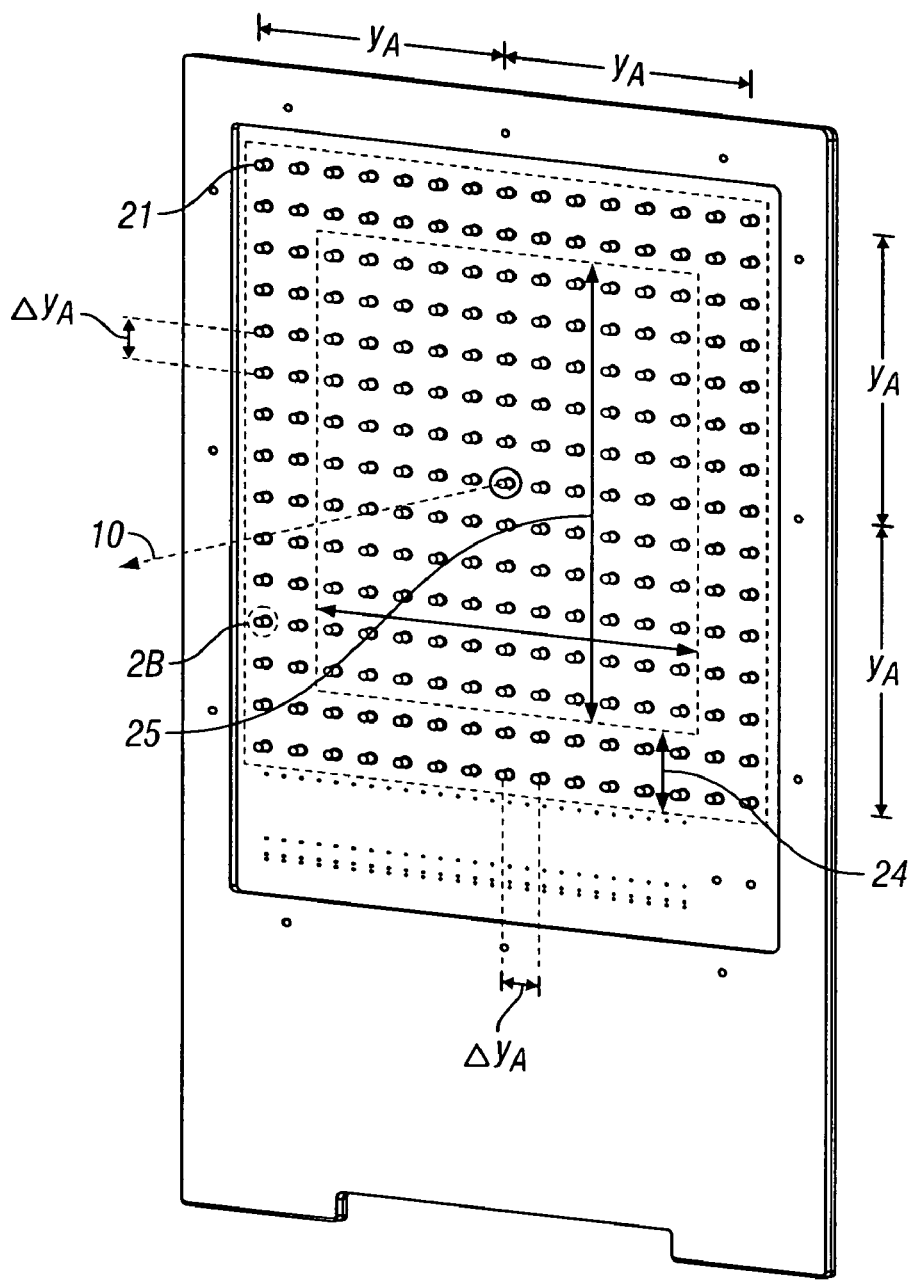
FIG. 2A illustrates details of an LED array according to the embodiment of the present invention as illustrated in FIG. 1.
Figure 2B:
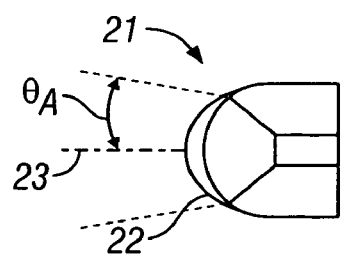
FIG. 2B illustrates a detail view of an LED for use in the LED array shown in FIG. 2A.

Referring to FIG. 2A, a detail view of the LED array 11 is illustrated. The array 11 is centered on the optical axis 10. FIG. 2B illustrates that each LED 21 is encapsulated with an integral microlens 22 that determines the angular profile of the beam that it projects. The angle $\theta_A$ may be defined to be the half-width, half-maximum angle of the beam profile projected by each microlens 22. This beam profile is nominally symmetrical about the major axis 23 of the LED 21. The LED array 11 is configured so the axis 23 of each LED is nominally parallel to the optical axis 10 of the illumination system.

The linear dimension $y_A$, from the optical axis 10 to the edge of the LED array 11 is selected to equal or slightly exceed the ratio $y_{En}f_F/z_{En}$, where $f_F$ is the focal length of the Fresnel lens 12 and $z_{En}$ is the distance from the front surface of the target plate 15 to the entrance pupil 17 of the projection lens assembly 16. The entrance pupil 17 is the virtual image of the aperture stop 18 as viewed from the target plate 15.

The LED's 21 in the array 11 are illustrated as being configured in a square pattern, however, any regular geometric pattern (such as hexagonal) is suitable. The separation distance $\Delta y_A$ between adjacent LED's is made sufficiently small to satisfy the requirements for uniform illumination of the target plate 15 and uniform illumination of the entrance pupil 17. The numerous LED's 21 used to form the array 11 will exhibit a distribution in intensity. That is because off-the-shelf LED's, by their nature, simply tend to vary from one another somewhat in their intensity. The brighter LED's are identified and then placed around the rim 24 of the array, and dimmer LED's are placed in the center of the array 25. For example, the "center" is advantageously defined as being the inner 11×11 square of LED's, as is illustrated in FIG. 2A. This feature counteracts the decrease in the throughput of the projection lens assembly 16 as a function of field angle and minimizes the angular variations in the intensity of the projected test pattern.

The LED's 21 are connected in series on strings, each string containing several LED's and a ballast resistor. All of the strings are connected to a constant voltage power supply. Adjacent LED's 21 in the array 11 are attached to different strings to minimize the variation in illumination as a function of field angle produced by the failure of any single string. According to a working example, each string has nine LED's and twenty-five strings are used to populate the array. In this working example, the array is composed of nine 5×5 sub-arrays of twenty-five LED's each, one LED from each of the strings being in each sub-array. This provides a separation of about $5 \cdot \Delta y_A$ between non-operating LED's in the event of a failure of one of the strings.

The condensing lens 12 is a converging Fresnel lens. It is aligned so that its optical axis coincides with the optical axis 10 of the system. The Fresnel lens 12 has a focal length, $f_F$. The values of $f_F$ and $\theta A$ (the half-beamwidth angle of the illumination profile of each LED 21) are matched so that $f_F$ is approximately equal to the ratio $y_{En}/\tan(\theta A)$ where $y_{En}$ is the radius of the entrance pupil 17 of the projection lens.

This condition allows the beam from each LED 21 to have the appropriate diameter at the entrance pupil so that it fills the pupil but does not appreciably over-fill the pupil. The focal length $f_F$ of the Fresnel lens 12 is matched to the distance $z_{En}$ between the Fresnel lens 12 and the entrance pupil 17 of the projection lens assembly. This allows the Fresnel lens 12 to refract the axis of the illumination beam profile 23 from each LED into an axis 13 that is aimed at the center of the entrance pupil of the projection lens 17. The distance $y_F$ from the optical axis 10 of the Fresnel lens 12 to its edge is slightly greater than that, $y_A$, of the LED array in order to capture all of the useful illumination from the LED array 11. A Fresnel lens is more compact, lighter, and cheaper than a conventional lens with the same focal length. It can be used in this context because high image quality is not required (or even desired) in the condensing lens assembly.

The separation $s_L$ between the rear surface of the Fresnel lens 12 and the microlenses of the LED array 11 is determined in a trade-off between the desire for uniform illumination and the desire to minimize the size of the system. When illumination from an LED 21 is refracted by the Fresnel lens 12 and viewed from the diffuser plate 14 it appears to originate from a virtual LED 19 located at a distance $s_V$ behind the Fresnel lens 12, where $s_v = s_L f_F/(f_F - s_L)$. The half-width, half-maximum angle $\theta v$ of the beam profile of the refracted rays from each LED corresponds to the relation $\theta v = \arctan[\tan(\theta A)(f_F - s_L)/f_F]$. The value of $s_L$ must be great enough so that beams from adjacent LED's 21, separated by $\Delta y_A$, overlap to produce a highly uniform illumination pattern on the diffuser plate 14. On the other hand, increasing $s_L$ increases both the overall length of the system and also the required radius of the Fresnel lens, $y_F$, which equals $y_A + s_L \tan(\theta A)$. In the limit of first order optics, the illumination beam profile from each LED 21 remains centered on the entrance pupil of the projection lens 17 and has the same diameter at the pupil as the value of $s_v$ varies. The distribution of radiation from each LED 21 onto the diffuser plate 14 becomes more uniform as $s_v$ increases, however.

The diffuser plate 14 is located on the target plate frame 31 near the rear surface of the target plate 15. It diffuses light from a collimated source into a pre-determined cone angle that is selected to be slightly larger than the angle between the virtual images of two adjacent LED 19 as seen from the rear surface of the target plate 15. This diffuser plate 14 causes all points on the target plate to be illuminated with nearly uniform intensity over a range of angles that fills the entrance pupil of the projection lens 17 but minimizes the out-of-pupil illumination that does not contribute to the useful image. It also suppresses small-scale variations in the intensity of illumination on the target plate 15. (The suppression of small-scale variations in illumination increases as the separation between the diffuser plate and the target plate increases.) According to a working example, the target plate 15 is a precision optical flat that has a test pattern imprinted on its front surface, facing the projection lens assembly 16. This test pattern, consisting of transparent, partially transparent, and opaque features, is typically produced by photolithography.

According to another aspect of the invention, an alignment device is provided that facilitates alignment of a target plate in a collimator that has a main optical axis. The alignment device has a slide and a gimbal. The slide is oriented to provide translational movement along the main optical axis. The gimbal is mounted on the slide and has an inner frame and an intermediate frame. The intermediate frame is free to rotate about a first gimbal axis that is substantially orthogonal to the main optical axis. The inner frame is free to rotate about a second gimbal axis that is substantially orthogonal to the first gimbal axis. The target plate is mounted on the inner frame so as to movable with respect to the collimator with one degree of translational freedom and two degrees of rotational freedom.

Figure 3:
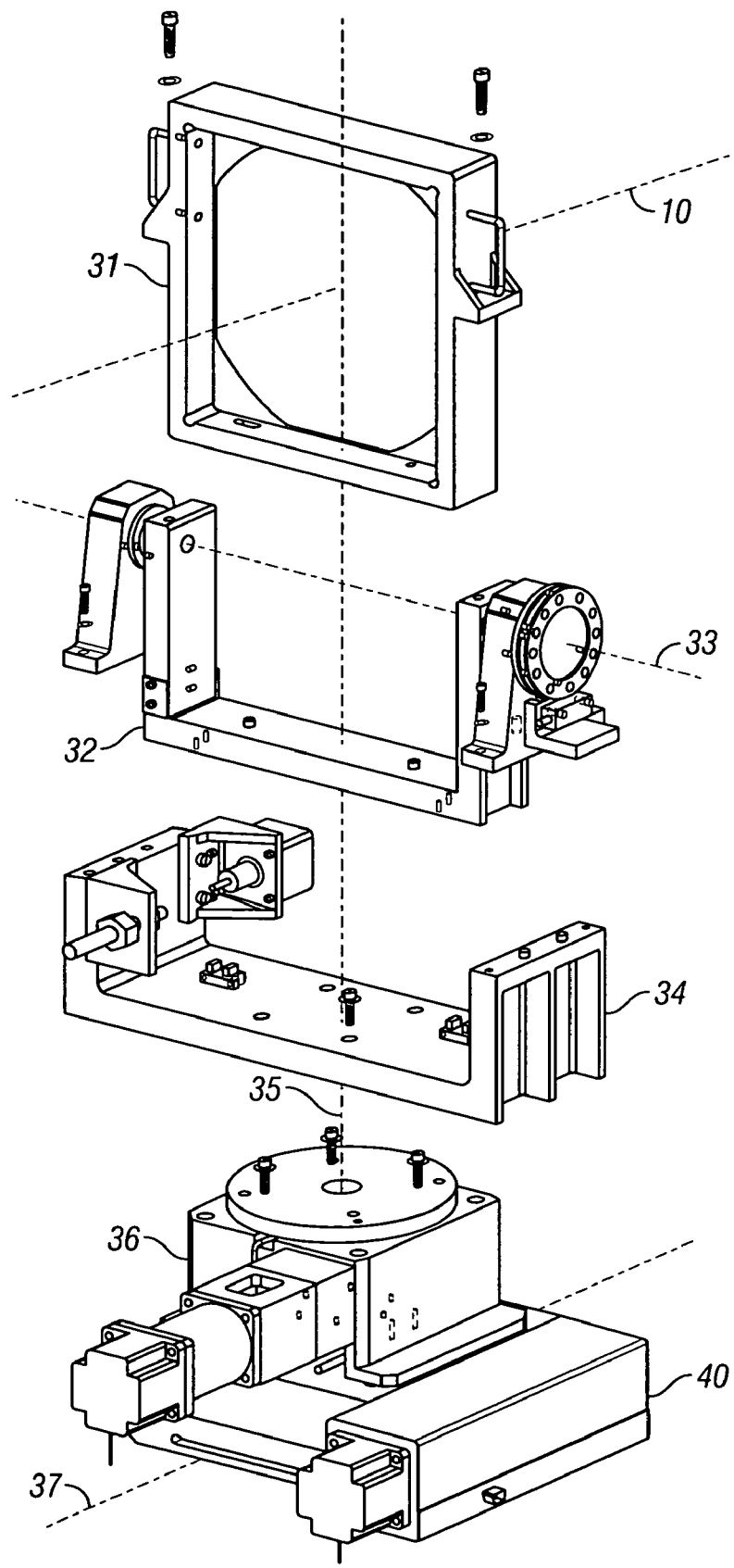
FIG. 3 illustrates an exploded view of an alignment mechanism according to an embodiment of the present invention.
Figure 4:
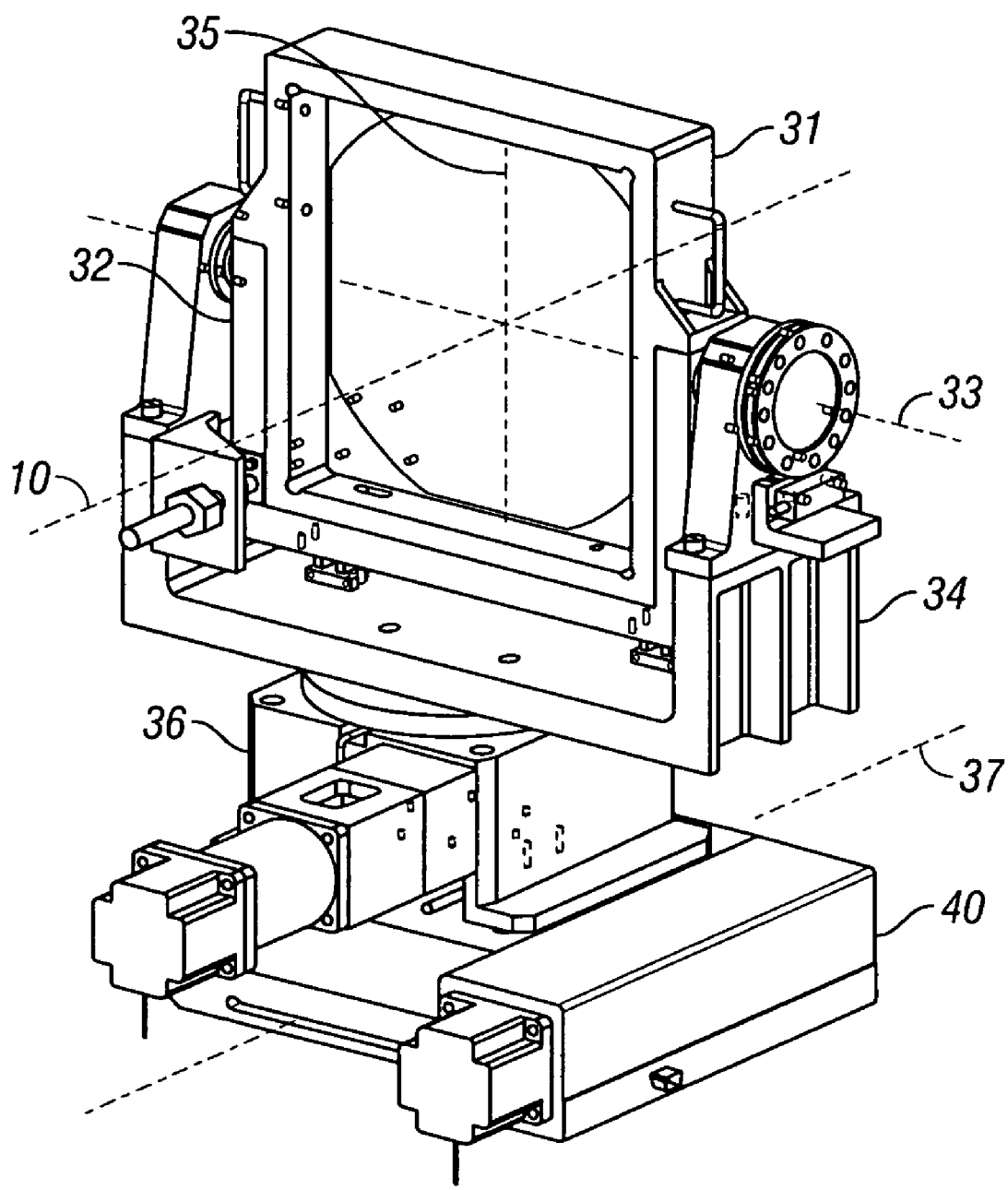
FIG. 4 illustrates an assembled view of an alignment mechanism according to the embodiment of the present invention as illustrated in FIG. 3.

Referring to FIGS. 3 & 4, an alignment mechanism that holds the diffuser plate and the target plate is illustrated in both exploded and assembled views. The target plate is held on the front of the target plate frame 31, on the side that faces the projection lens assembly 16. At a minimum, precision adjustments in each of three degrees of freedom are used to align the front surface of the target plate 15 with the focal plane of the projection lens assembly 16 over its entire field of view. A fourth precision adjustment, rotation about the optical axis 10 of the projection lens (known as "clocking"), may also be need in some applications.

Figure 5:
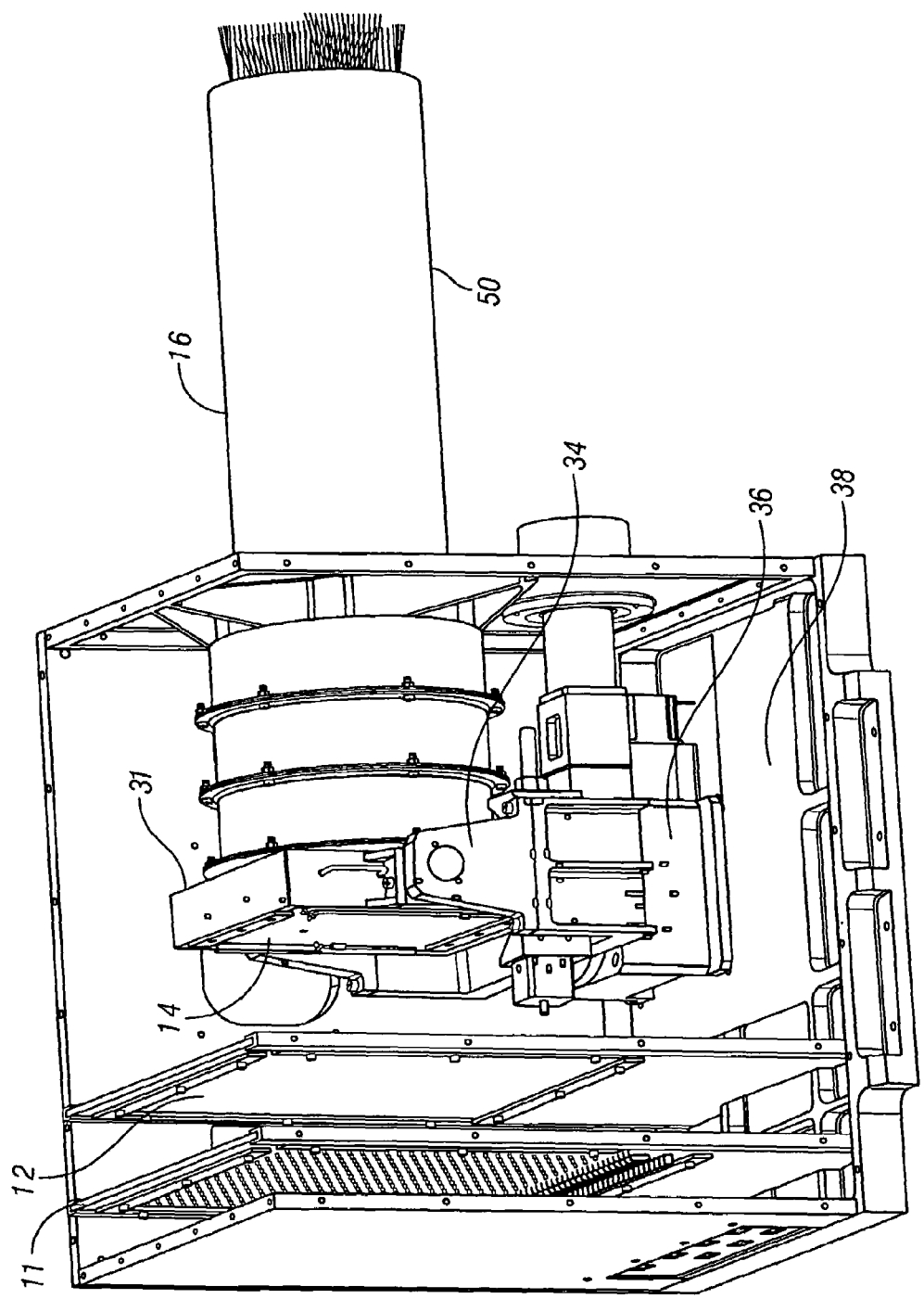
FIG. 5 illustrates an assembled view of a collimator according to an embodiment of the present invention.

Referring to FIG. 5, an assembled view of a collimator according to an embodiment of the present invention is illustrated. In FIG. 5, two panels have been removed. The target plate is held in a frame 31 that is mounted on the inner frame 32 of a two-axis gimbal system. This inner frame 32 rotates about a horizontal axis 33. The inner frame 32 and a mechanism to rotate it about the horizontal axis 33 are mounted on an intermediate frame 34 that rotates about a vertical axis 35. This intermediate frame 34 and a mechanism to rotate it about the vertical axis 35 are mounted on an outer frame 36 that is on a translation stage 40. This outer frame 36 may be translated along an axis 37 that is parallel to the common optical axis 10 of the projection lens assembly 16 and the Fresnel lens 12. The translation stage 40 (not shown in FIG. 5) is mounted on an optical bench 38 to which the other optical components are rigidly attached. Ideally, this optical axis 10 intersects the two rotational axes 33, 35 on the front surface of the target plate 15 allowing each of the three degrees of freedom to be varied independently to facilitate focusing. The projection lens assembly is housed in a barrel 50.

With the gimbal geometry illustrated and described above (refer to FIG. 4), a feature that is located on the front surface of the target plate 15 at the intersection of the two rotational axes 33, 35 will remain at the same position when the target plate is rotated about either of these rotational axes 33, 35. All features that lie on the horizontal axis 33 will remain in the same location when the target plate is rotated about that axis. When aligning the target plate 15 to the focal plane of the projection lens assembly 16 it is advantageous to first bring a feature at the intersection of the two axes into focus by translating the outer frame 36 along the translation axis 37 parallel to the optical axis 10. The second operation is to focus a feature that is located on the horizontal axis 33 but displaced from the vertical axis 35 by rotating the intermediate frame 34 about the vertical axis 35. The first feature will remain in focus during this procedure. The final operation is to focus a feature that is displaced from the horizontal axis 33 by rotating the inner frame 32 about the horizontal axis 33. Both of the initial features will remain in focus during this procedure.

The projection lens assembly 16 is a custom-designed lens that is optimized over the narrow spectral band of the LED's being used 21. It is desirable to place the exit pupil as far forward as possible, i.e., toward the front surface of the lens farthest from the target plate. Because the projection lens assembly 16 is only required to achieve good image quality over a narrow spectral band, it is easier to design and fabricate than a lens that is required to operate over a broader spectral range. It is also easier to apply anti-reflection coatings to the lens elements, since they are only required to be effective over this narrow spectral band.

Figure 6:
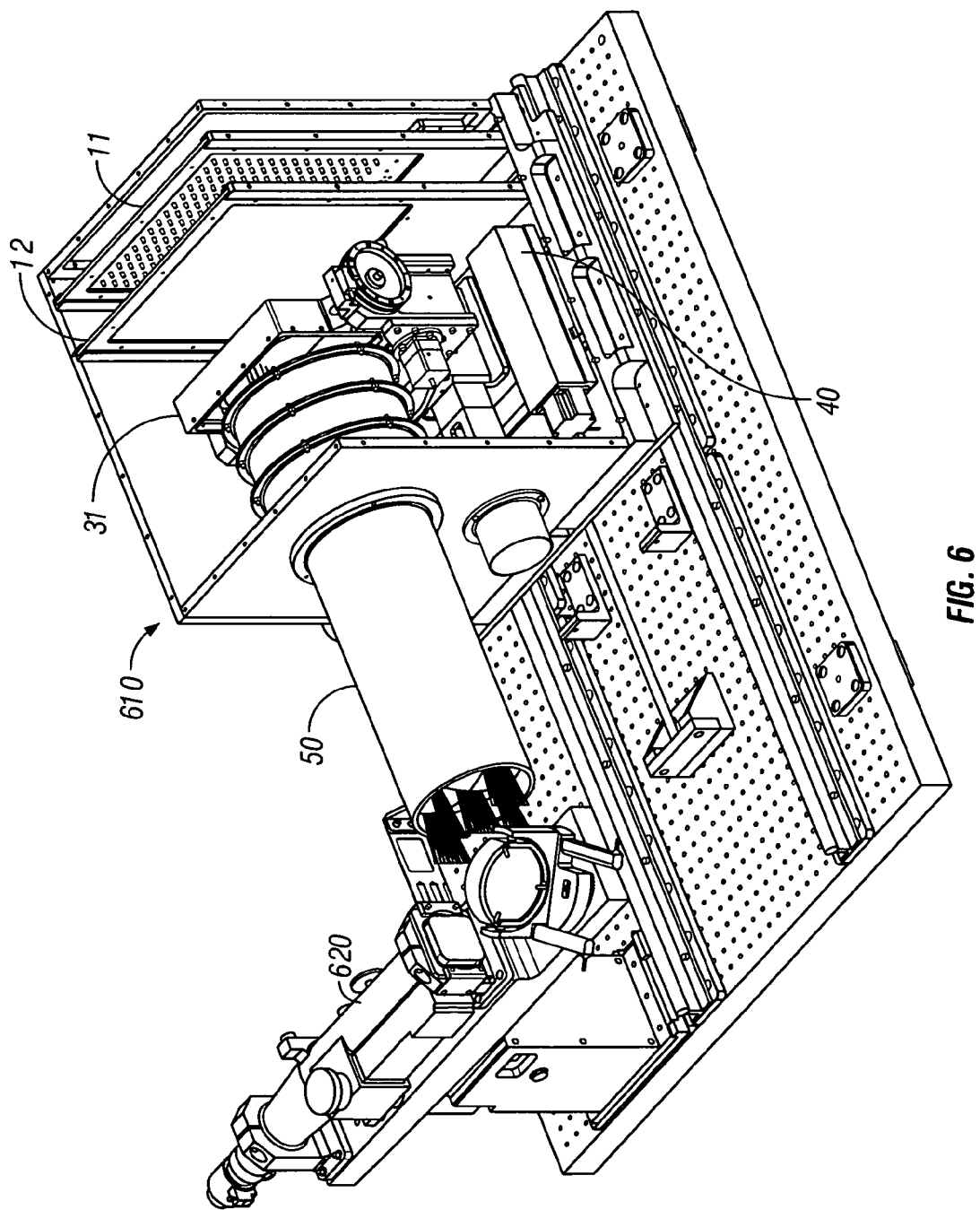
FIG. 6 illustrates a collimator according to the exemplary embodiment of the present invention, in combination with an auto-collimating alignment telescope.

Referring to FIG. 6, a collimator 610 according to the exemplary embodiment of the present invention is illustrated in combination with an auto-collimating alignment telescope 620. In addition to the optical assembly described above, an alignment telescope 620 is useful to determine when features on the target plate 15 are in focus. It is preferable to use an auto-collimating telescope; i.e., a telescope with a narrow FOV and a means to determine when it is focused at infinity. After it is focused at infinity, it is used to view various features on the target plate 15 through the projection lens assembly 16 with the target plate 15 illuminated by the illumination system 11, 12.

The alignment telescope may advantageously be mounted adjacent the collimator to be swung into position where an IUT would ordinarily sit looking into the collimator. Since the alignment telescope is only required to operate over the narrow spectral range of the LED's, its design and construction can also be simplified.

Some aspects for the exemplary embodiment illustrated are summarized as follows. The exemplary embodiment is designed to characterize instruments that view the Earth in from geostationary orbit, where it subtends a circle 17.4 degrees in diameter. To test dynamic scanning behavior of these instruments over the full-Earth disk, the exemplary collimator needs to meet its performance goals throughout an 18 degree circular FOV.

The illustrated embodiment characterizes two IUT's, each having an aperture diameter of 305 mm. One IUT, the Sounder, has a visible channel with a spectral band from 670–720 nanometers (nm). The exemplary collimator's illumination source needs to operate in this spectral range. The other IUT, the Imager, has visible pixels that subtend 28 microradians. The MTF of the WFC needs to exceed 0.60 at a frequency of 18,000 line pairs per radian, (lines approximately one-pixel wide) throughout the FOV.

In the exemplary embodiment, all points on the target plate are coincident with the focal plane of the projection lens to within a tolerance of about 25 microns. This means that three precision degrees of freedom need to be adjusted to within this tolerance. It is desirable that these degrees of freedom be focus, tip, and tilt, with the tip and tilt axes intersecting at a point on the front surface of the target plate. When this geometry is used, the focus degree of freedom, i.e., translation along the optical axis of the projection lens, can be used to observe a target feature at this intersection of axes and bring this point into sharp focus. This feature will then remain in focus as the other degrees of freedom pivot the plate about two orthogonal axes passing through this point. Likewise, a point on one of the axes will remain in focus when the plate is rotated about that axis. This decoupling of the three degrees of freedom simplifies the alignment procedure.

The LED array of the exemplary embodiment provides illumination via an array of 225 commercially-available LED's, each of which is manufactured with an integral microlens that confines its radiant output to a predetermined cone angle. The exemplary embodiment uses Epitex L680 LED's. The LED's were selected to have a beamwidth matched to the optical speed of the projection lens, f/4.7, corresponding to a numerical aperture of 0.106 and a limiting angle of approximately +/−6 degrees. These LED's are attached to a flat printed circuit board with the optical axis of each LED approximately perpendicular to the plane of the board. Each electronic string consists of nine LED's connected in series with each other and with a ballast resistor with a resistance of 330 Ohms, powered by a single 35 Volt constant-voltage source.

The Fresnel lens of the exemplary embodiment is described as follows. The light from the LED's is incident on a converging Fresnel lens with a focal length approximately equal to the separation between it and the exit pupil of the projection lens. The illumination profile from each LED/microlens assembly is a cone centered about a ray perpendicular to the plane of the lens. The illumination pattern that exits the Fresnel lens has a narrower cone angle and is centered about a ray that is centered on the center of the exit pupil of the projection lens, optimizing the efficiency of projection of the radiation from each LED. The Fresnel lens also increases the overlap of beams from the different LED's at the diffuser plate. A Fresnel lens is used to perform this function instead of a conventional lens because neither high image quality nor chromatic compensation is required and because the Fresnel lens is lighter, more compact, and less costly. The Fresnel lens used in this specific embodiment has a focal length of 24" (610 cm) and a square cross section of 12"×12". It is available from Edmunds Scientific.

The diffuser plate of the illustrated embodiment is described as follows. A diffuser plate is located a few centimeters behind the target plate on the frame. In the illustrated embodiment, the diffuser plate is a thin sheet fabricated by a holographic technique. It diffuses a collimated beam into a cone of approximately 10 degrees. This cone angle is as large as the separation angle between adjacent LED's as viewed from the rear surface of the target plate. In the illustrated embodiment, the diffuser plate is an 8"×8" holographic diffuser with a 10 degree full cone angle. It is also available from Edmunds Scientific.

The target plate of the exemplary embodiment is described as follows. The target plate is a precision optical flat with precision features fabricated on its front surface by photolithography. Its dimensions are 8"×8"×0.25" (203.2 mm×203.2 mm×6.35 mm). The circular FOV is a circle approximately 7.6" in diameter on the target plate.

The precision alignment mechanism of the exemplary embodiment is described as follows. The function of the precision alignment mechanism is to position the target plate in the focal plane of the projection lens. It has been motorized so that a single person can adjust the critical degrees for freedom via remote control while viewing a small area on the target plate through the projection lens and an alignment telescope, as discussed below. As discussed above, the outer degree of freedom is translation parallel to the optical axis of the projection lens, the intermediate degree of freedom is rotation about a vertical axis, and the inner degree of freedom is rotation about a horizontal axis.

The projection lens of the exemplary embodiment is described as follows. The performance of the projection lens is specified in terms of its FOV, aperture diameter, effective focal length (EFL), MTF, and maximum allowable distortion, as well as the locations of its entrance and exit pupils. The MTF requirements must be met with whatever illumination source is used. In the exemplary embodiment, the illumination source has a narrow spectral range of 680 nm+/−15 nm. Since chromatic aberrations are only relevant over this narrow range, the design of the lens is simpler than that of a lens that must operate over the entire spectral range of the human eye, for example (approximately 400–700 nm). According to the exemplary embodiment, the lens has an MTF of>0.6 at 30 line pairs/mm over the entire FOV of 18 degrees, within a spectral range of 660–700 nm, an aperture diameter of 128 mm, and an EFL of 610 mm. The exit pupil has a diameter of 101 mm and is located 483 mm from the target plate.

The auto-collimating telescope of the exemplary embodiment is described as follows. An auto-collimating telescope with a narrow FOV is focused at infinity, and is then used to view the target plate through the projection lens. The telescope has an internal illumination source that is used, in combination with a lens cap with an internal plane mirror placed over the aperture of the telescope, to focus the auto-collimating telescope at infinity.

The procedure of using a collimator according to an embodiment of the present invention is described as follows. The auto-collimating telescope's internal light source is turned on, and the reflection from the mirror on the inner surface of the lens cap is viewed. The telescope's focus is adjusted until the image reflected by the plane mirror is in sharp focus, verifying that it is focused at infinity. Its lens cap is then removed, its internal light source is turned off, and the collimator's illumination source is turned on, illuminating the target plate. The alignment subsystem is adjusted so all features on the target plate within the required FOV are in focus when viewed through the autocollimating telescope. A plane mirror with tip and tilt adjustments is used to enable the autocollimator to view a minimum of three widely separated features on the target plate during the focusing procedure. An iterative process, viewing each of three widely separated features on the target plane several times, is usually required to properly align the target plate in the focal plane of the projection lens. After this alignment has been verified, the autocollimator and the fold mirror are removed from the system.

The projection lens then collimates the test pattern. The angular separation of test plate features in collimated space (in radians) is equal to their linear separation on the test plate divided by the EFL (effective focal length) of the projection lens. This test pattern is then used to evaluate the IUT.

The terms condensing lens assembly and projection lens, as used in this disclosure, are not meant to exclude reflective, catadioptric, holographic, or other optical elements having equivalent functions.

The specific embodiment is not required to operate in vacuum. However, the low power consumption of the LED's in comparison to conventional light sources and the high efficiency of the illumination system are particularly advantageous in vacuum, since atmospheric conduction and convection are not available to cool the illumination source. The ballast resistors that are placed in series with each string of LED's can be located outside the vacuum chamber for purposes of heat dissipation from the resistors. Alternatively, power consumption may be reduced by use of a constant current power source for each string of LED's, eliminating the need for ballast resistors.

The illustrated embodiment is a collimator focused at infinity and used to characterize an IUT that is also focused at infinity. The illustrated embodiment only requires an optical image within a spectral band. Neither of these conditions should restrict the applicability of the invention. This illumination technique can be used with or without the proposed focusing mechanism. It can be used to focus at infinity or at a finite distance.

The present invention may be practiced using any color (or even non-visible band) LED's. It can be used with an array of LED's operating at different colors with a colored target surface. An array of LED's of one color may be swapped out for a substitute array of LED's of a different color. When this is done, the system will need to be re-focused to do chromatic sensitivity of the system's elements. Fortunately, in most instances this may be handled simply by translating the target plat along the axis of the system until it is re-focused. If the simple translation is ineffective, then the converging lens assembly can be swapped out for one having an appropriate focal length at the wavelength of the LED's currently being used for the illumination source.

Specific applications of an optical system according to the present invention include, but are not limited to, heads-up displays, monitors, and projectors for movies, slides and transparencies. The narrow spectral band of this invention is advantageous for a heads-up display on a window surface, since it is possible to apply a coating to the window that is highly reflective over the narrow spectral band of the LED's and highly transparent at other visible wavelengths.

The illustrated embodiments addressed a system operating with an illumination source operating over a single narrow spectral band. This invention is also applicable for use with an illumination system that illuminates the focal plane of the projection lens assembly with several colors, either simultaneously or sequentially. The target in the focal plane is not restricted to a static image, but could contain a moving image, including but not limited to a conventional movie film, or a modulated electro-optical device, including but not limited to a liquid crystal display or a micro-shutter assembly.

Having thus described the basic concepts of the invention, it will be readily apparent to those skilled in the art that the foregoing detailed disclosure is intended to be presented by way of example only, and is not limiting. Various alterations, improvements and modifications will occur to those skilled in the art, but are not expressly stated above. These and other modifications, alterations and improvements are intended to be suggested by the disclosure herein, and are within the scope of the invention. Accordingly, the present invention is limited only by the following claims and equivalents thereto.

What is claimed is:

1. An optical projection system for projecting an image, the system comprising:
    an array of discrete light sources, with multiple light sources that are monochromatic and incoherent and that project light along a beam profile having a central axis, wherein light sources along a rim of the array have a greater intensity than other light sources of the array;
    a first lens disposed to refract the central axis of the beam profile from the multiple light sources into a projector axis that is aimed at an entrance pupil of a second lens;
    a diffuser plate disposed to diffuse the light from the first lens; and
    a target disposed to be illuminated by the light diffused by the diffuser plate and to contain an image to be projected by the second lens.

2. An optical projection system for projecting an image, the system comprising:
    an array of discrete light sources, with multiple light sources that are monochromatic and incoherent and that project light along a beam profile having a central axis, wherein light sources near a center of the array have a lower intensity than other light sources of the array;
    a first lens disposed to refract the central axis of the beam profile from the multiple light sources into a projector axis that is aimed at an entrance pupil of a second lens;
    a diffuser plate disposed to diffuse the light from the first lens; and
    a target disposed to be illuminated by the light diffused by the diffuser plate and to contain an image to be projected by the second lens.

3. An optical projection system for projecting an image, the system comprising:
    an array of discrete light sources, with multiple light sources that are monochromatic and incoherent and that project light along a beam profile having a central axis;
    a first lens disposed to refract the central axis of the beam profile from the multiple light sources into a projector axis that is aimed at an entrance pupil of a second lens;
    a diffuser plate disposed to diffuse the light from the first lens; and
    a target disposed to be illuminated by the light diffused by the diffuser plate and to contain an image to be projected by the second lens, wherein a focal length of the first lens is approximately equal to a radius of the entrance pupil of the projection system divided by a tangent of a half beam width angle of the beam profile.

4. An optical projection system for projecting an image, the system comprising:
    an array of discrete light sources, with multiple light sources that are monochromatic and incoherent and that project light along a beam profile having a central axis;
    a first lens disposed to refract the central axis of the beam profile from the multiple light sources into a projector axis that is aimed at an entrance pupil of a second lens;
    a diffuser plate disposed to diffuse the light from the first lens; and
    a target disposed to be illuminated by the light diffused by the diffuser plate and to contain an image to be projected by the second lens, wherein an area of the array is larger than an area of the target, wherein the areas are taken along a perpendicular plane to an optical axis of the optical projection system.

5. An optical projection system for projecting an image, the system comprising:
    an array of discrete light sources, with multiple light sources that are monochromatic and incoherent and that project light along a beam profile having a central axis;
    a first lens disposed to refract the central axis of the beam profile from the multiple light sources into a projector axis that is aimed at an entrance pupil of a second lens;
    a diffuser plate disposed to diffuse the light from the first lens; and
    a target disposed to be illuminated by the light diffused by the diffuser plate and to contain an image to be projected by the second lens, wherein an area of the target is larger than an area of the entrance pupil of the second lens, wherein the areas are taken along a perpendicular plane to an optical axis of the optical projection system.

* * * * *

UNITED STATES PATENT AND TRADEMARK OFFICE
CERTIFICATE OF CORRECTION

PATENT NO. : 7,159,986 B2
APPLICATION NO. : 10/441915
DATED : January 9, 2007
INVENTOR(S) : James C. Bremer et al.

It is certified that error appears in the above-identified patent and that said Letters Patent is hereby corrected as shown below:

| | | |
|---|---|---|
| COLUMN 1, | LINE 25, | after "such" and before "telescopes" insert --as-- |
| COLUMN 4, | LINE 3, | at the beginning of the line, change "In is" to --It is-- |
| COLUMN 6, | LINE 7, | change "axis of" to --axis 23 of-- |
| COLUMN 6, | LINE 8, | after "profile" delete "23" |
| COLUMN 6, | LINE 9, | change "pupil of the projection lens 17" to --pupil 17 of the projection lens-- |
| COLUMN 6, | LINE 36, | change "projection lens 17" to --entrance pupil 17-- |
| COLUMN 6, | LINE 49, | change "pupil of the projection lens 17" to --pupil 17 of the projection lens-- |
| COLUMN 7, | LINE 5, | after "to" and before "movable" insert --be-- |
| COLUMN 7, | LINE 18, | change "need" to --needed-- |
| COLUMN 11, | LINE 3, | change "plat" to --plate-- |

Signed and Sealed this

Seventh Day of April, 2009

JOHN DOLL
*Acting Director of the United States Patent and Trademark Office*